United States Patent
Miyanaga

(10) Patent No.: US 9,025,225 B2
(45) Date of Patent: May 5, 2015

(54) COLOR ADJUSTMENT APPARATUS, COLOR ADJUSTMENT METHOD, AND NON-TRANSITORY COMPUTER-READABLE RECORDING MEDIUM STORING A COLOR ADJUSTMENT PROGRAM

(71) Applicant: KYOCERA Document Solutions Inc., Osaka (JP)

(72) Inventor: Yuka Miyanaga, Osaka (JP)

(73) Assignee: KYOCERA Document Solutions Inc. (JP)

( * ) Notice: Subject to any disclaimer, the term of this patent is extended or adjusted under 35 U.S.C. 154(b) by 20 days.

(21) Appl. No.: 13/946,314

(22) Filed: Jul. 19, 2013

(65) Prior Publication Data

US 2014/0029027 A1 Jan. 30, 2014

(30) Foreign Application Priority Data

Jul. 27, 2012 (JP) ................................. 2012-167820

(51) Int. Cl.
| | |
|---|---|
| G03F 3/08 | (2006.01) |
| G06K 15/02 | (2006.01) |
| H04N 1/00 | (2006.01) |
| H04N 1/60 | (2006.01) |
| G06F 3/12 | (2006.01) |

(52) U.S. Cl.
CPC ........ G06K 15/1878 (2013.01); H04N 1/00068 (2013.01); H04N 1/00023 (2013.01); H04N 1/6033 (2013.01); H04N 1/6097 (2013.01); G06F 3/1208 (2013.01); G06F 3/1232 (2013.01); G06F 3/1256 (2013.01); G06F 3/1285 (2013.01)

(58) Field of Classification Search
USPC .................................................. 358/501–598
See application file for complete search history.

(56) References Cited

U.S. PATENT DOCUMENTS

| | | | |
|---|---|---|---|
| 6,803,933 B1 * | 10/2004 | Staelin et al. ................. 347/131 |
| 7,184,680 B2 | 2/2007 | Sawada | |
| 7,471,913 B2 | 12/2008 | Sawada | |
| 2008/0158626 A1 * | 7/2008 | Bang et al. .................... 358/518 |

FOREIGN PATENT DOCUMENTS

| | | |
|---|---|---|
| JP | 4319929 | 6/2009 |
| JP | 2012-23771 | 2/2012 |
| JP | 2012-32340 | 2/2012 |

* cited by examiner

*Primary Examiner* — Benny Q Tieu
*Assistant Examiner* — Michael Y Tzeng
(74) *Attorney, Agent, or Firm* — McDonnell Boehnen Hulbert & Berghoff LLP

(57) ABSTRACT

A color adjustment apparatus includes an acquisition unit acquiring the color value for specified paper of a desired image forming apparatus and a color value for unspecified paper, a generation unit generating a relational expression associating the color value for the specified paper with the color value for the unspecified paper, a registration unit obtaining and registering an association between the property information of a reference color for the unspecified paper and the relational expression, a calculation unit calculating the predicted color value for the specified paper of another image forming apparatus based on a relational expression associated with the property information of the reference color of arbitrary paper and the color value for the same paper of the other image forming apparatus, and a setting unit setting the predicted color value as a color value to be reproduced by the desired image forming apparatus.

16 Claims, 12 Drawing Sheets

COLOR ADJUSTMENT APPARATUS, COLOR ADJUSTMENT METHOD, AND NON-TRANSITORY COMPUTER-READABLE RECORDING MEDIUM STORING A COLOR ADJUSTMENT PROGRAM

INCORPORATION BY REFERENCE

This application is based upon, and claims the benefit of priority from, corresponding Japanese Patent Application No. 2012-167820 filed in the Japan Patent Office on Jul. 27, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to a color adjustment apparatus, a color adjustment method, and a non-transitory computer-readable recording medium storing therein a color adjustment program, each of which reproduces a desired color tone. In particular, the present disclosure relates to reproducing, in a desired image forming apparatus, a color tone in another image forming apparatus.

Generally, manufacturers recommended specific paper to use when printing to image forming apparatuses such as printers. As long as the recommended paper is used, an given image quality such as a color tone is ensured. However, in many cases, paper that has not been recommended is used when printing, and thus printing with a given color tone cannot be ensured.

Therefore, various types of techniques have been proposed, each of which is used for enhancing the reproducibility of a color tone by, for example, making a correction based on a printing environment such as a difference in paper. In addition, corrections are made involving, for example, linear conversion, gamma correction, and the amount of heat or time taken for melting toner.

However, even if such corrections and the like are made, it may be difficult to faithfully reproduce a color tone ensured by a manufacturer. In addition, since making such a correction requires highly technological knowledge, it may be difficult to achieve an ideal color tone.

In addition, there is a need for continuity of color tones across multiple image forming apparatuses. For example, when a printer is replaced with a new product, there is a need to reproduce, in the new printer, the color tones of the previously used printer.

A method such as that illustrated in FIG. 11 exists as a measure for responding to such needs. Printing is performed on both a current printer 2 and a new printer 1 using the same input data and the same recommended paper P1. The individual color values are measured and an association between the measured values is applied to the new printer 1. Accordingly, it may be possible to reproduce the color tones of the current printer 2 on the new printer 1.

Since a manufacturer possesses the color values of the printer 1 when printing with the recommended paper P1, the above-mentioned measure may be relatively easily performed.

In some instances, however, other paper is used in place of the recommended paper P1. In this case, the paper used for comparison between color values is desired to be the same. Specifically, as illustrated in FIG. 12, it is desired that comparison between color values printed by printers 1 and 2 be performed using either the recommended paper P1 (in an upper stage) or other paper P2 (in a lower stage).

However, for example, when a user is in a remote location (such as overseas), when it is difficult to obtain the recommended paper, or when it is difficult for the manufacturer to easily prepare the printer 2, it is difficult to acquire the color values of the printer 2 using the recommended paper P1. In such a case, it may be difficult to perform the comparison illustrated in the upper stage of FIG. 12.

Further, the printer 1 includes a color conversion table used for reproducing color tones on the premise of the usage of the recommended paper P1. Therefore, it may be difficult to directly apply, to the color conversion table, the result of the color comparison obtained using the method in the lower stage in FIG. 12.

Therefore, if paper other than the recommended paper has been used when printing to the printer 2, it will be difficult to reproduce the color tones of the printer 2 with the printer 1.

The present disclosure relates to a color adjustment apparatus, a color adjustment method, and a non-transitory computer-readable recording medium storing therein a color adjustment program, each of which enables reproduction, in a desired image forming apparatus, of the color tone thereof by predicting with a high degree of accuracy a color value of another image forming apparatus when using recommended paper, regardless of whether or not the image forming apparatuses or paper types are identical.

SUMMARY

A color adjustment apparatus according to an aspect of the present disclosure includes a color value acquisition unit, a relational expression generation unit, a paper information registration unit, a predicted color value calculation unit, and a reproduced color value setting unit. The color value acquisition unit acquires a color value for a specified paper of a desired image forming apparatus and a color value for one or more types of unspecified paper. The relational expression generation unit obtains, for each of the pieces of unspecified paper, a relational expression associating the color value for the specified paper with the color value for the unspecified paper. The paper information registration unit obtains property information of a reference color for the unspecified paper and registers an association between the relational expression for each of the pieces of the unspecified paper with the property information of the reference color. The predicted color value calculation unit calculates a both predicted color value for the specified paper of another image forming apparatus based on the relational expression identified using property information of a reference color for arbitrary paper scheduled to be used and a color value for the arbitrary paper of the other image forming apparatus. The reproduced color value setting unit sets the predicted color value as a color value to be reproduced by the desired image forming apparatus.

A color adjustment method including: acquiring a color value for a specified paper of a desired image forming apparatus and a color value for one or more types of unspecified paper; obtaining, for each of one or more pieces of unspecified paper, a relational expression associating the color value for the specified paper with the color value for the unspecified paper; obtaining property information of a reference color for the unspecified paper; registering an association between the relational expression for each of the pieces of the unspecified paper with the property information of the reference color; calculating a predicted color value for the specified paper of another image forming apparatus based on the relational expression identified using property information of a reference color for arbitrary paper and a color value of the other image forming apparatus for the arbitrary paper; and setting the predicted color value as a color value to be reproduced by the desired image forming apparatus.

In addition, a non-transitory computer-readable recording medium according to an aspect of the present disclosure, which stores therein a color adjustment program, is a program used for color adjustment, and causes a computer to function as a color value acquisition unit, a relational expression generation unit, a paper information registration unit, a predicted color value calculation unit, and a reproduced color value setting unit. The color value acquisition unit acquires a color value for a specified paper of a desired image forming apparatus and a color value for one or more types of unspecified paper. The relational expression generation unit obtains, for each of one or more pieces of the unspecified paper, a relational expression associating the color value for the specified paper with the color value for the unspecified paper. The paper information registration unit obtains property information of a reference color for the unspecified paper and registers an association between the relational expression for each of the pieces of the unspecified paper with the property information of the reference color. The predicted color value calculation unit calculates both a predicted color value for the specified paper of another image forming apparatus based on the relational expression identified using property information of a reference color for arbitrary paper scheduled to be used and a color value for the arbitrary paper of the other image forming apparatus. The reproduced color value setting unit sets the predicted color value as a color value to be reproduced by the desired image forming apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses and method are described herein. Other example embodiments or features may further be utilized, and other changes may be made, without departing from the spirit or scope of the subject matter presented herein. In the following detailed description, reference is made to the accompanying drawings, which form a part thereof.

An embodiment of a color adjustment apparatus of the present disclosure will be described. The color adjustment apparatus of the present disclosure is an apparatus capable of reproducing, in a desired image forming apparatus (defined as a printer 1), a color tone of an image forming apparatus (defined as a printer 2).

Figure 1:
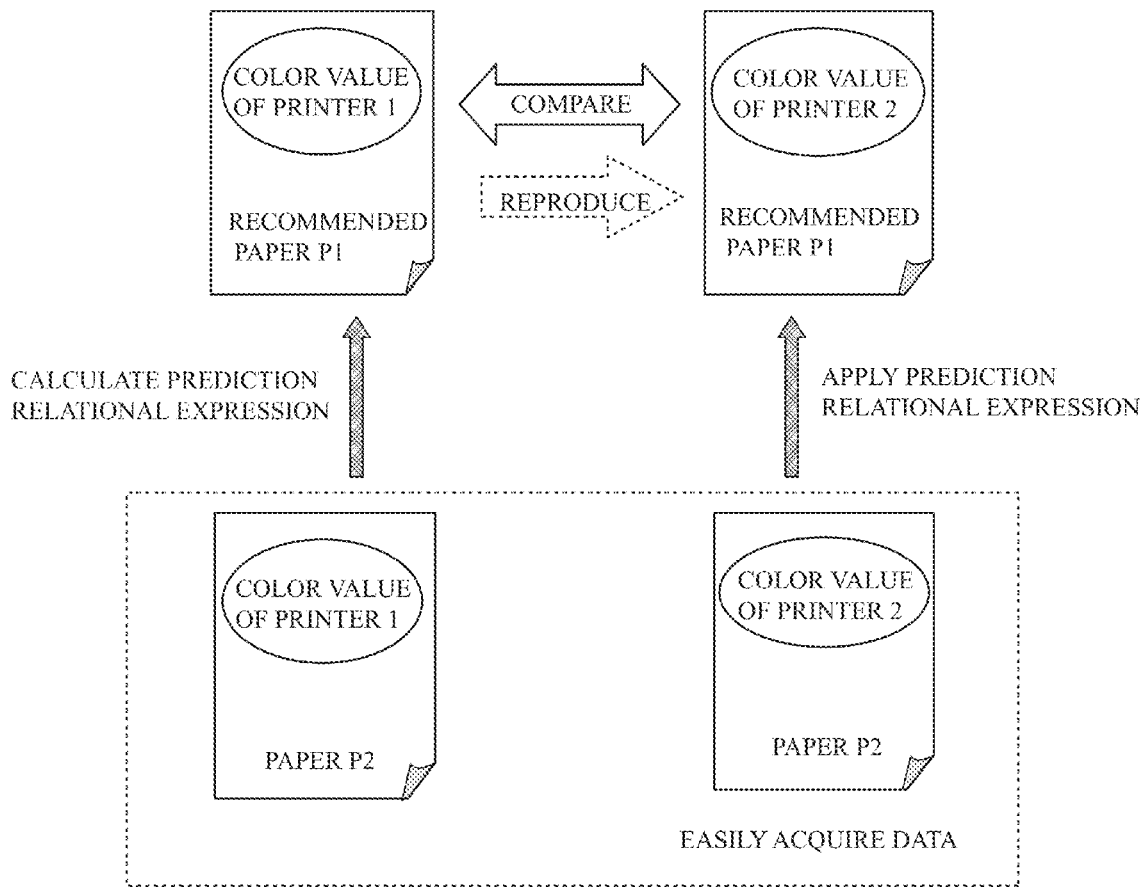
FIG. 1 shows a schematic diagram explaining color value prediction in an embodiment of the present disclosure.

As illustrated in FIG. 1, a prediction relational expression F is calculated based on a relationship between a color value for recommended paper P1 of the printer 1 and a color value for paper P2 scheduled by a user to be used in the printer 1. By applying the prediction relational expression F to a color value for the paper P2 currently used in the printer 2, the color value is predicted for the recommended paper P1 of the printer 2. Based on the predicted color value, a color tone of the printer 2 is reproduced in the printer 1.

According to this method, it may be possible to easily reproduce the color tone of the printer 2 in the printer 1. It may be possible for a maker to easily acquire the color value for the paper P2 of the printer 1 or the paper P2 of the printer 2 for (in a lower stage in FIG. 1) from a user or a sales company. In addition, the maker possesses a color value for the recommended paper P1 in the printer 1 (in the left of an upper stage in FIG. 1). Accordingly, even in a situation where it may be difficult to obtain the color value for the recommended paper P1 of the printer 2, it may be possible to easily predict the corresponding color value.

The color adjustment apparatus 1 is configured using a computer including a CPU, a ROM, a RAM, and the like. By executing a color adjustment program stored in the ROM, the color adjustment apparatus 1 includes a communication function enabled to transmit and receive data to and from the printer 1, the printer 2, and/or an interface for inputting and outputting desired data. For example, a color adjustment apparatus including such a configuration and a function may be configured by using an information processing apparatus such as a personal computer or an image forming apparatus such as a printer. Therefore, the following description of the present embodiment will be described using an example as though the printer 1 were a color adjustment apparatus including a desired configuration.

Figure 2:
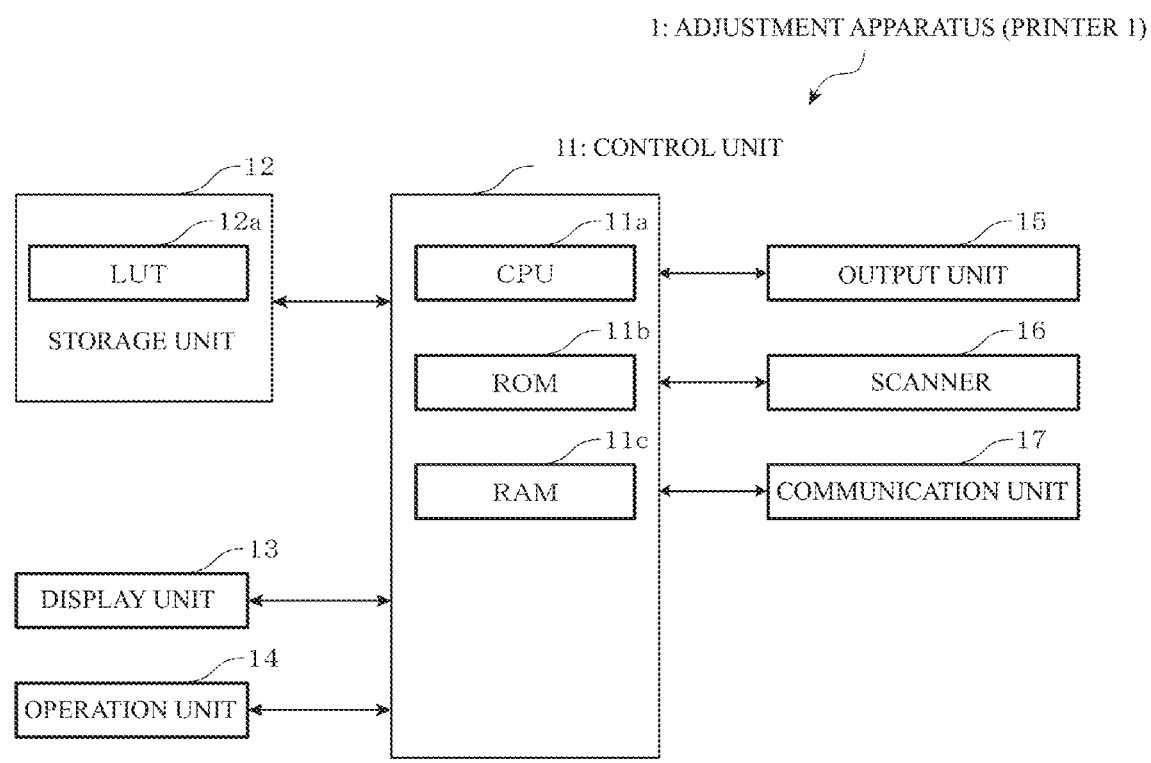
FIG. 2 shows a configuration diagram of a color adjustment apparatus (printer) according to an embodiment of the present disclosure.

FIG. 2 shows the configuration diagram of a color adjustment apparatus according to the present embodiment. The color adjustment apparatus 1 of the present embodiment includes a storage device 12, a display unit 13 including a liquid crystal panel or the like, an operation unit 14, an output unit 15, a scanner 16, a communication unit 17, and a control unit 11 controlling the operations of these individual configuration units. The storage device 12 includes a color conversion table 12a that is referred to when color conversion is performed. The operation unit 14 inputs a desired instruction or information. The output unit 15 prints, on paper, image data subjected to an image process such as color conversion. The scanner 16 reads a document or the like from a flatbed scanner (not illustrated). The communication unit 17 communicates print data or the like with a printing computer (a personal computer or the like) (not illustrated) through a LAN or the like.

The control unit 11 includes a CPU 11a, a ROM 11b, and a RAM 11c. In the present embodiment, by reading a predetermined program from the ROM 11b and executing the read program, the CPU 11a performs an operation for reproducing a color tone in the printer 2 or causes another configuration unit to perform the operation. In addition, the RAM 11c is used as a working memory when the CPU 11a executes a program.

Figure 3:
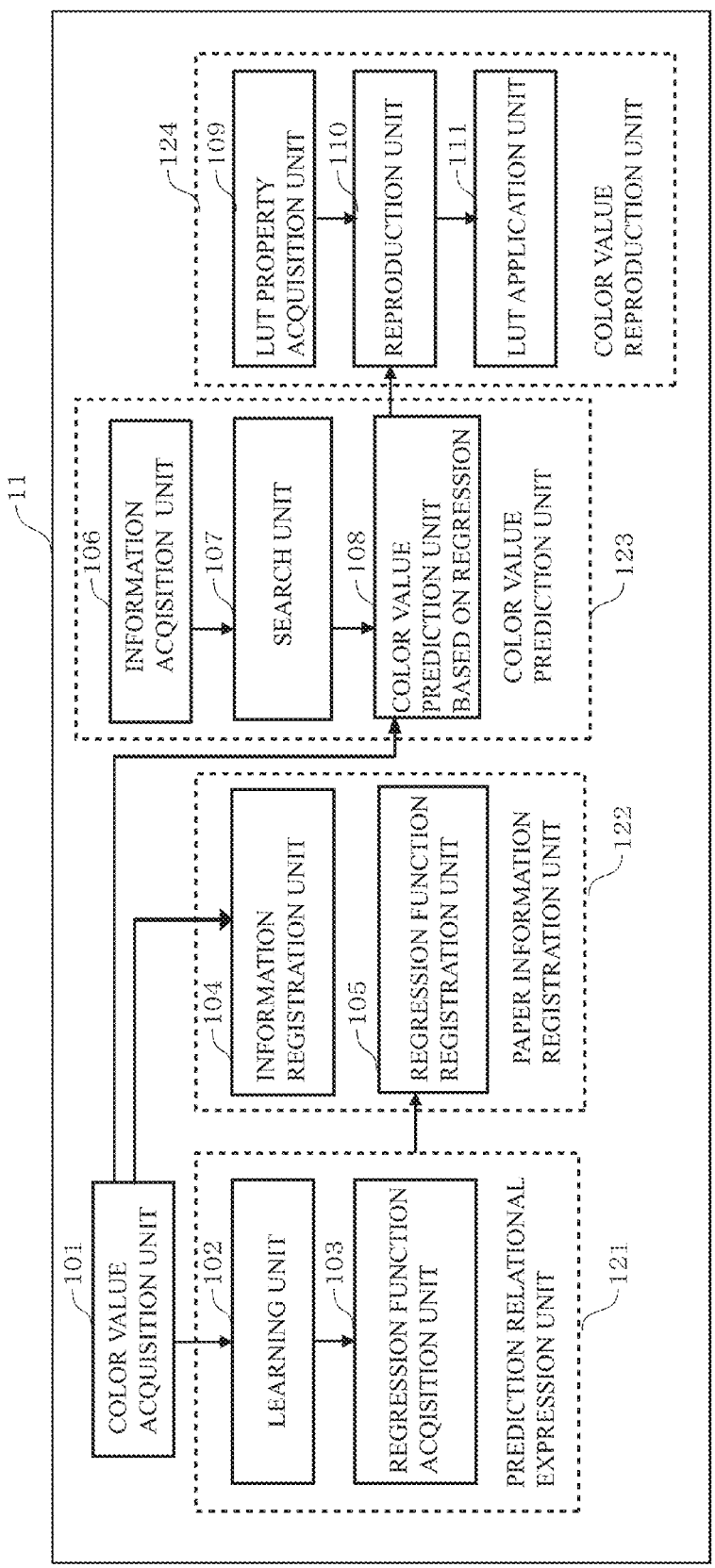
FIG. 3 shows a functional block diagram of a control unit in a color adjustment apparatus.

FIG. 3 shows the functional block diagram of a control unit in a color adjustment apparatus. The control unit 11 includes a color value acquisition unit 101, a prediction relational expression generation unit 121, a paper information registration unit 122, a color value prediction unit 123, and a color reproduction unit 124. The color value acquisition unit 11 measures a color value (spectral reflectivity) of a chart output by the printer 1, and acquires obtained measurement data. Specifically, in the printer 1, a chart based on input data is printed on one or more types of paper (unspecified paper) P*, and a color value group bn is obtained, the color values of which serve as the measurement values of each piece of paper. In addition, a chart based on the same input data is printed on recommended paper (specified paper) P1, and a color value group is obtained from the measurement values thereof (a color value acquisition unit). The color value groups are used to extract a difference in color tone between different pieces of paper printed by the same printer and represent the difference using a relational expression. An acquired color value is delivered to the prediction relational expression generation unit 121. In addition, as for the color value of a chart, the chart may be measured using, for example, a specific measuring instrument, and the measurement value thereof may be manually acquired. Further, the measurement value may be automatically acquired by measuring the chart using the scanner 16.

In addition, the color value acquisition unit 101 also performs a processing operation where the color value property of the reference color of a target arbitrary paper is acquired and, by printing the same chart as the above-mentioned chart on the arbitrary paper using the printer 2, a color value group is calculated based on the measurement values of the chart. Paper that has been used in printing by the printer 2 corresponds to the "arbitrary paper" and is to reproduce a color tone for the paper in the printer 1 that has been used in the printer 2. In addition, the color value acquisition unit 101 in this case outputs an acquired color value to the color value prediction unit 123.

Figure 4:
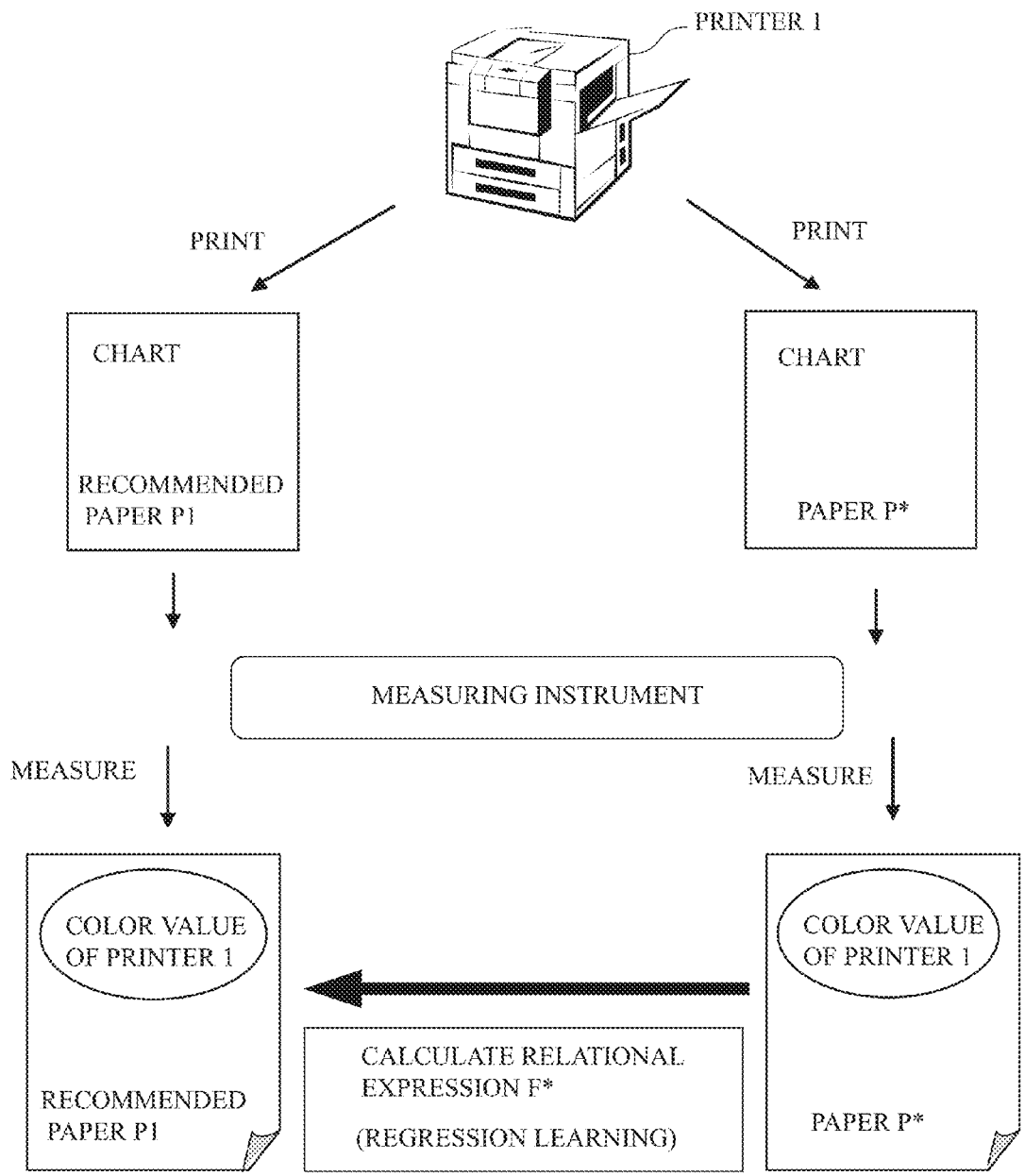
FIG. 4 shows a schematic diagram illustrating a method for obtaining a relational expression according to an embodiment of the present disclosure.

The prediction relational expression generation unit (a relational expression generation unit) 121 obtains, for each piece of paper P* of the printer P1, a relational expression (a prediction relational expression) associating the color value for the recommended paper P1 of the printer 1 with the color value for the paper P* of the printer 1. The prediction relational expression generation unit 121 includes a learning unit 102 and a regression function acquisition unit 103. The learning unit 102 obtains a learning result for returning from the color value group bn to the color value group an, both of which are acquired by the color value acquisition unit 101. Based on the learning result, the regression function acquisition unit 103 obtains a regression function (a relational expression) used for predicting color values. In other words, as illustrated in FIG. 4, in order to acquire a property of the printer 1, the same chart is printed on each of the recommended paper P1 and the paper P*. In addition, a relational expression F* is calculated between "the color value for the recommended paper P1 of the printer 1" and "the color value for the paper P* of the printer 1" using a measuring instrument.

For example, based on the following Expression (1), spectral reflectivities with respect to given wavelengths in the measurable range (380 to 730 nm) of the paper P* are multiplied by predetermined coefficients and the sum thereof is obtained. In addition, the relational expression F is calculated by performing on these a regression learning process using a Random Forest method with respect to each wavelength.

$$a_n = \sum_{m=380}^{730} t_{nm} \cdot b_m + t_{n0} + \varepsilon_n \quad (1)$$

($\varepsilon$: an error term)

In addition, the prediction relational expression F* with respect to each piece of paper P*, obtained using the regression learning process, is delivered to the paper information registration unit 122.

Figure 5:
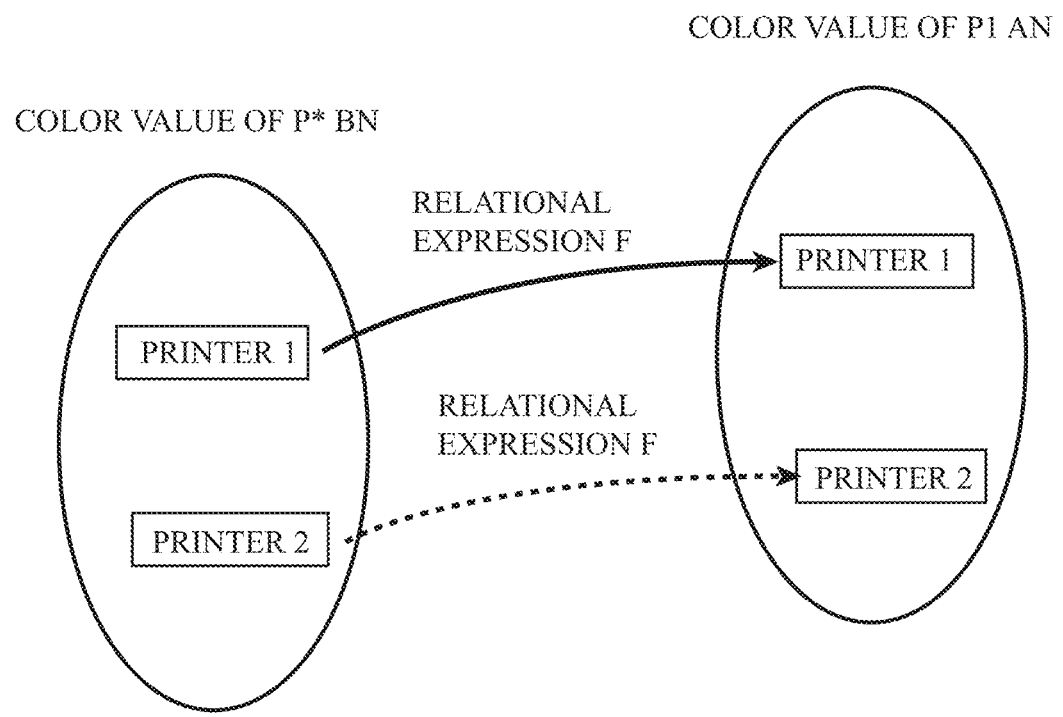
FIG. 5 shows a schematic diagram illustrating a relationship between a prediction relational expression and a printer according to an embodiment of the present disclosure.

As illustrated in FIG. 5, a relationship (the prediction relational expression F) between the color value bn for the paper P* of the printer 1 and the color value for the recommended paper P1 is the same as a relationship (the prediction relational expression F) between the color value bn for the paper P* of the printer 2 and the color value for the recommended paper P1. Therefore, even if it may be difficult to obtain the latter relationship, it may be possible to predict the color value for the recommended paper P1 of the printer 2 using the former relationship. In addition, the Random Forest method is one method of regression learning used for obtaining the two relationships. Other existing regression learning may also be used.

The paper information registration unit 122 obtains the property information of a reference color (at least a white color or another solid color) for the paper P*, and registers the property information in the storage device 12 by associating, as a search key, the property information with the relational expression of each piece of paper P*. The paper information registration unit 122 includes an information registration unit 104 for a reference color, and a regression function registration unit 105.

In the information registration unit 104, for example, the ground color of the paper P* may be defined as the reference color, and a parameter based on a relationship between a wavelength and a spectral reflectivity may be used.

Figure 6:
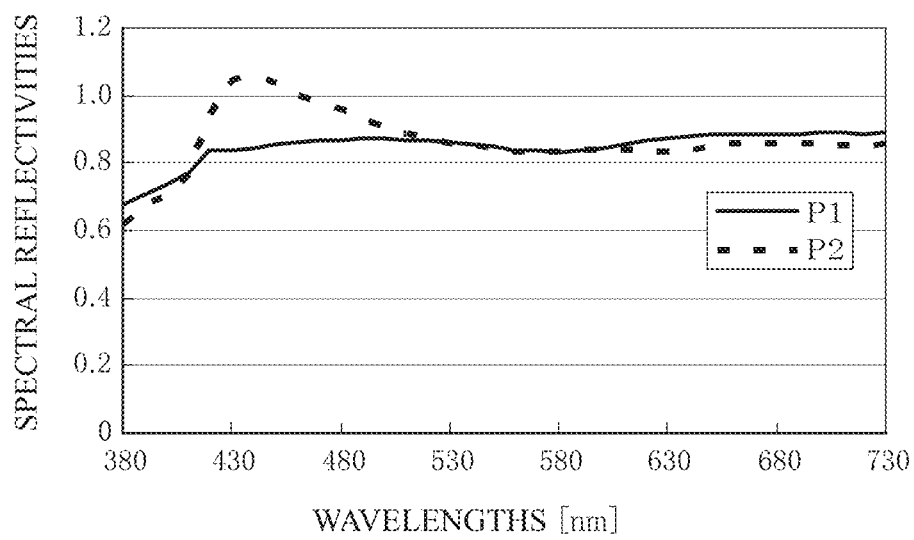
FIG. 6 shows a schematic diagram illustrating a spectral reflectivity with respect to each piece of paper according to an embodiment of the present disclosure.

FIG. 6 shows a schematic diagram illustrating relationships between wavelengths and spectral reflectivities in the ground colors of the recommended paper P1 and the paper P2. As illustrated in the drawing, the exemplified paper P2 is notably different in spectral reflectivity from the paper P1 in the range of wavelengths 420 to 490 nm. In this way, since a spectral reflectivity is different in a given wavelength depending on paper, it may be possible to use the spectral reflectivity as property information for identifying a type of paper. The regression function registration unit 105 registers an association between the property information of the reference color and the relational expression F* of a regression function for the paper P*. In other words, as illustrated in FIG. 7, a set is registered with respect to each piece of paper, the set containing both the relational expression F* relating to the paper P* and the property information of the reference color of the paper P*, and a database is compiled.

Based on a relational expression identified from the property information of a reference color for arbitrary paper scheduled to be used and the color value for the arbitrary paper of the printer 2, the color value prediction unit (a predicted color value calculation unit) 123 calculates the predicted color value for the recommended paper P1 of the printer 2. The color value prediction unit 123 includes an information acquisition unit 106 for a reference color, a search unit 107 for the reference color, and a color value prediction unit 108 based on a regression function.

The information acquisition unit 106 for the reference color measures and acquires the property information (spectral reflectivity) of the reference color for arbitrary paper using the scanner 16 or a measuring instrument. Based on the acquired property information of the reference color, the search unit 107 for the reference color accesses and searches a specific storage area in the storage device 12 and identifies and acquires a relational expression determined to be the relational expression of the same paper. For example, a relational expression associated is acquired with the same (or most closely related) property information as that of the reference color.

Figure 7:
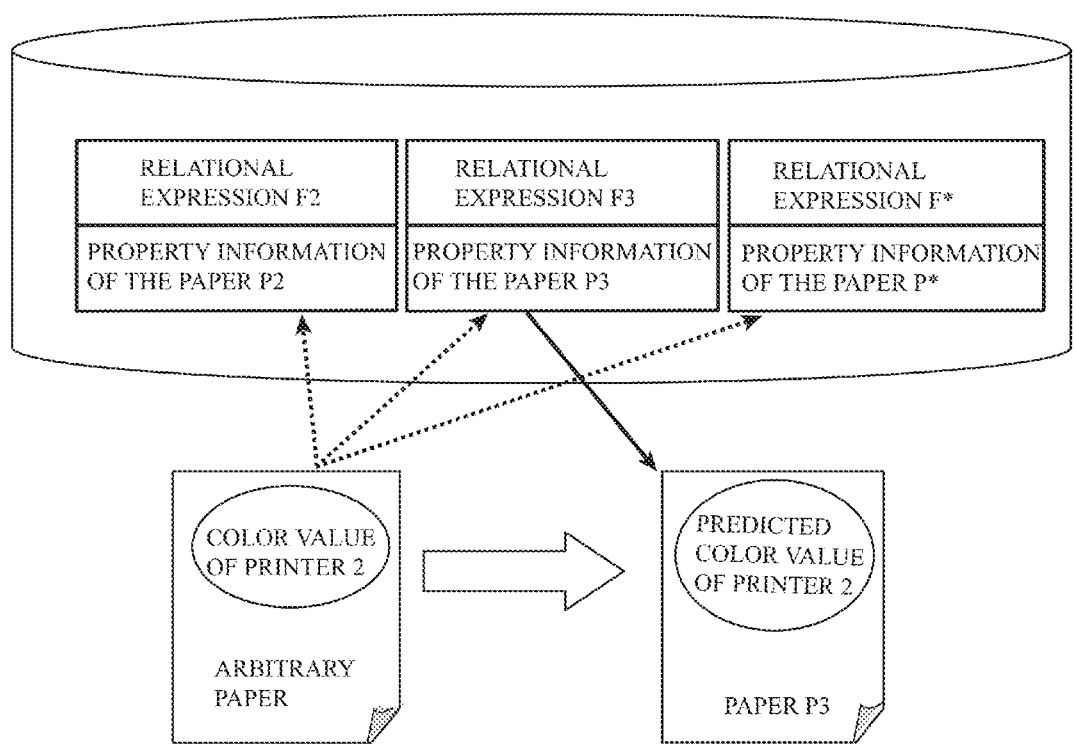
FIG. 7 shows a schematic diagram illustrating a color value prediction database with respect to each piece of paper according to an embodiment of the present disclosure.

For example, in an example illustrated in FIG. 7, paper P3 (from among a plurality of pieces of paper P*) is determined to be the same as the arbitrary paper, and a relational expression F3 is extracted from a storage area indicating a relationship between the color value for the paper P3 of the printer 1 and the color value for the recommended paper P1 of the printer 1. Based on the identified relational expression and a regression function, the color value prediction unit 108 predicts the color value for the recommended paper P1 of the printer 2.

Based on the predicted color value obtained by the color value prediction unit 123, the color reproduction unit (a reproduced color value setting unit) 124 sets a color value to be reproduced by the printer 1. The color reproduction unit 124 includes an LUT property acquisition unit 109, a reproduction unit 110 for a color value, and an LUT application unit 111. The LUT property acquisition unit 109 acquires, from the storage device 12, the color value information of the LUT 12a initially installed in the printer 1. The LUT 12a may be configured using, for example, the combination of a first table converting an input color value (RGB) into Lab and a second table converting the Lab into an output value (CMYK). In addition, ensured color values (Lab or the like) are designed in the LUT 12a based on the recommended paper P1. The reproduction unit 110 for a color value defines a predicted color value obtained by the color value prediction unit 123 as a target color (a color to be reproduced), and performs an arithmetic operation for applying the predicted color value to the LUT 12a. For example, the obtained predicted color value is converted into a corresponding Lab value in the first table in the LUT 12a, and the converted color value is defined as a reproduced color value. The LUT application unit 111 applies data to the LUT 12a according to the reproduced color value subjected to the arithmetic operation.

In this way, according to the color adjustment apparatus 1, the color value acquisition unit 101 acquires the color value for the recommended paper P1 (a specified paper) of the printer 1 and a color value for one or more types of unspecified paper P*, the prediction relational expression generation unit 121 obtains, for each piece of unspecified paper, the relational expression F associating the color value for the recommended paper P1 with the color value for the unspecified paper P*, and the paper information registration unit 122 obtains the property information of the reference color for the unspecified paper P* and registers an association between the property information of the reference color and the relational expression of each piece of unspecified paper. In addition, the color value prediction unit 123 calculates both the predicted color value for the recommended paper P1 of the printer 2 based on the relational expression F (identified based on the property information of the reference color for an arbitrary paper) and the color value for the arbitrary paper of the printer 2, and the color reproduction unit 124 sets that predicted color value as a color value to be reproduced by the printer 1.

In other words, by measuring a chart printed by the same printer and generating a prediction expression from the relationship thereof, a relational expression is generated having a high prediction accuracy. Therefore, even if a target color has not been printed using the recommended paper, it may become possible to predict and reproduce, with a high degree of accuracy, a value obtained in a printing environment using the recommended paper.

In addition, since the relationship of a color value with the recommended paper is obtained is registered with respect to one type of unspecified paper P* or each of two or more types of unspecified paper P*, it may be possible to reproduce a target color even if the type of paper is unknown.

Next, a color adjustment method will be described. A color adjustment method of the present embodiment adopts a process in which the calculation of a prediction relational expression, information registration for each piece of paper, and the generation of reproduced data are performed in order.

Figure 8:
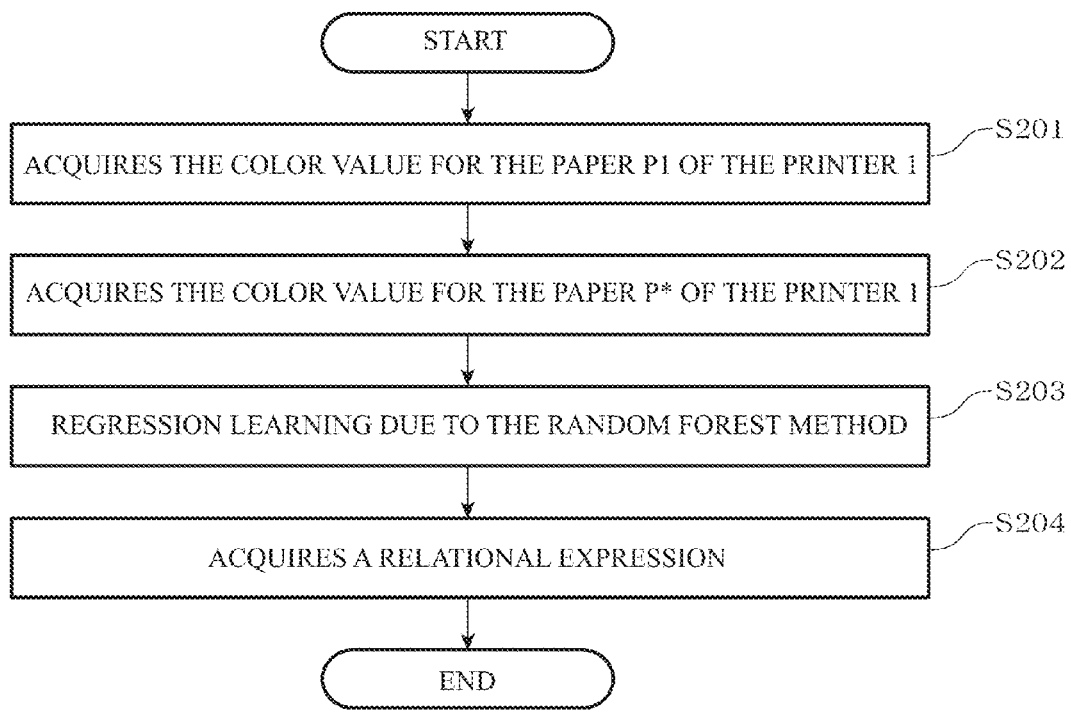
FIG. 8 shows a flowchart illustrating a calculation procedure for a prediction relational expression according to an embodiment of the present disclosure.

FIG. 8 shows a flowchart illustrating a calculation procedure for a prediction relational expression. First, the color value acquisition unit 101 acquires the color value 1 for the recommended paper P1 of the printer (S201). Next, the color value acquisition unit 101 acquires the color value for the paper P* of the printer 1 (S202). Subsequently, based on the color value for the recommended paper P1 of the printer 1 and the color value for the paper P*, the learning unit 102 performs a regression learning process using the Random Forest method (S203). In addition, the regression function acquisition unit 102 acquires a relational expression obtained as a result of the learning process (S204).

Figure 9:
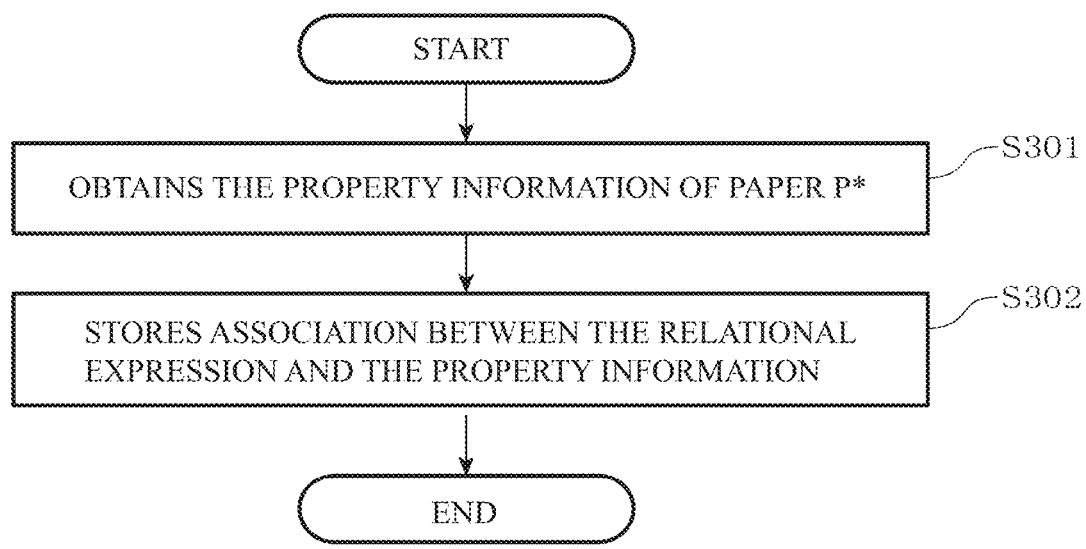
FIG. 9 shows a flowchart illustrating a registration procedure for paper information according to an embodiment of the present disclosure.

FIG. 9 shows a flowchart illustrating an information registration procedure for each piece of paper. First, the paper information registration unit 122 obtains the property information of the reference color of the paper P* as a search key. In addition, both the relational expression obtained in the previous process and a corresponding search key are stored in a specific storage area as being associated with each other (S301 and S302).

Figure 10:
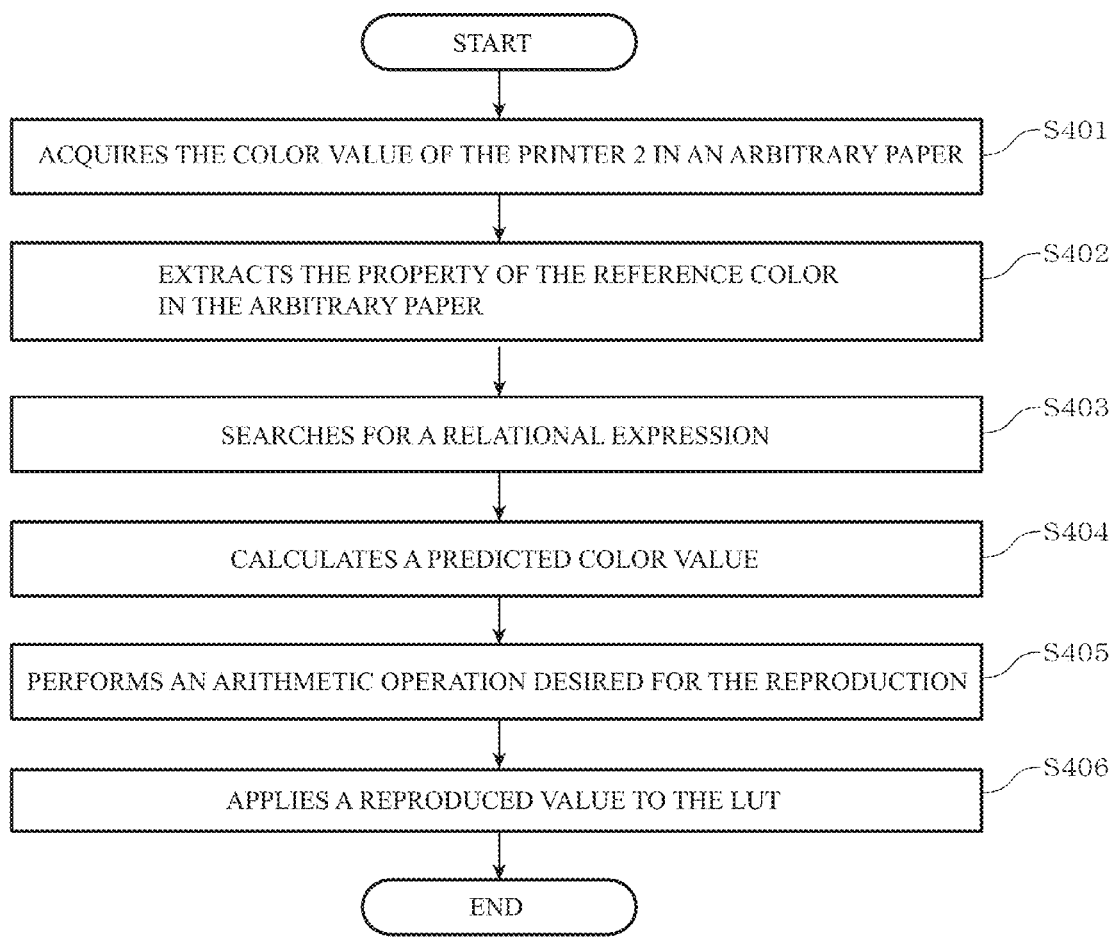
FIG. 10 shows a flowchart illustrating a procedure for color value prediction and color value reproduction according to an embodiment of the present disclosure.
Figure 11:
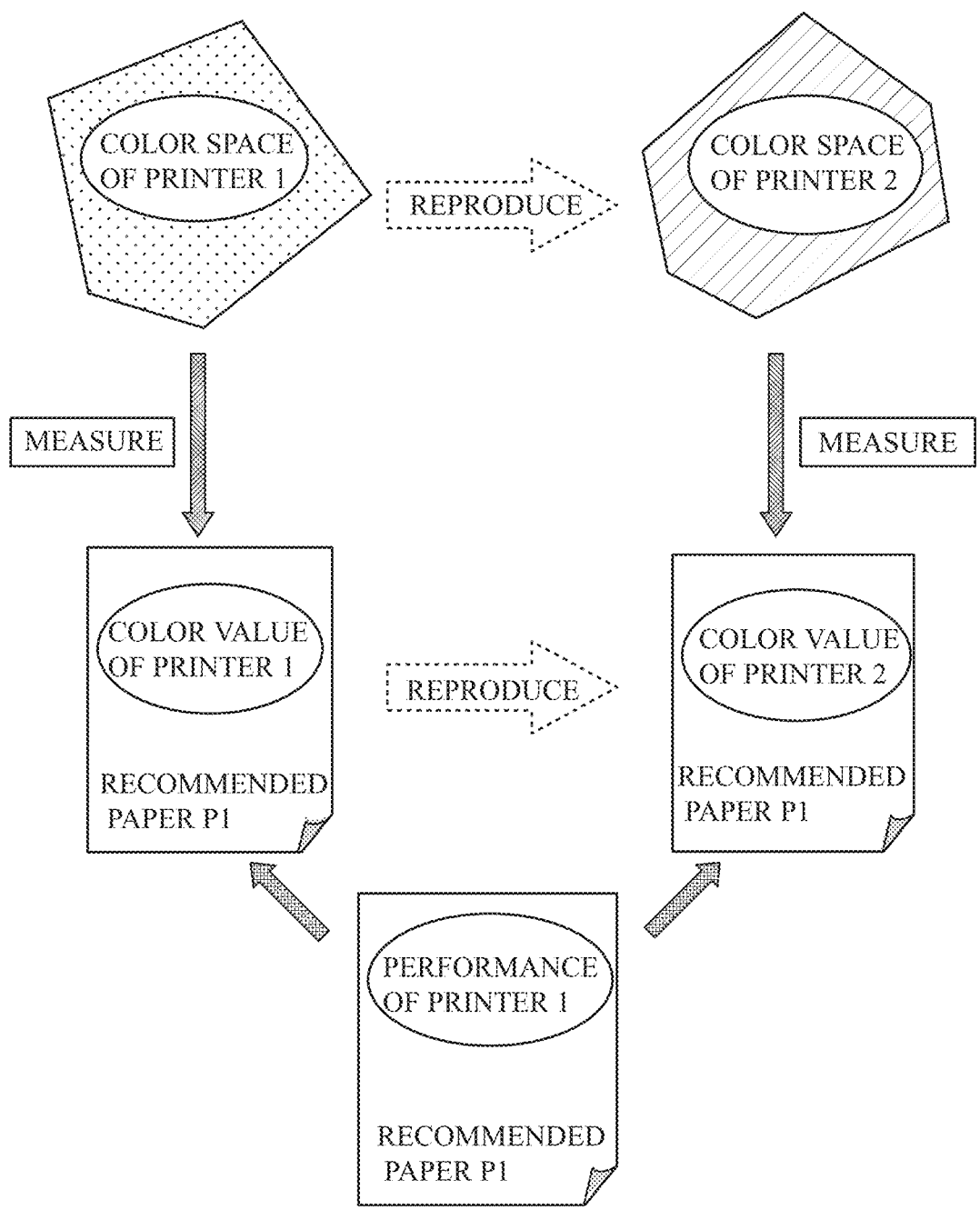
FIG. 11 shows a schematic diagram illustrating a method for reproducing a color value based on color comparison for recommended paper according to an embodiment of the present disclosure.
Figure 12:
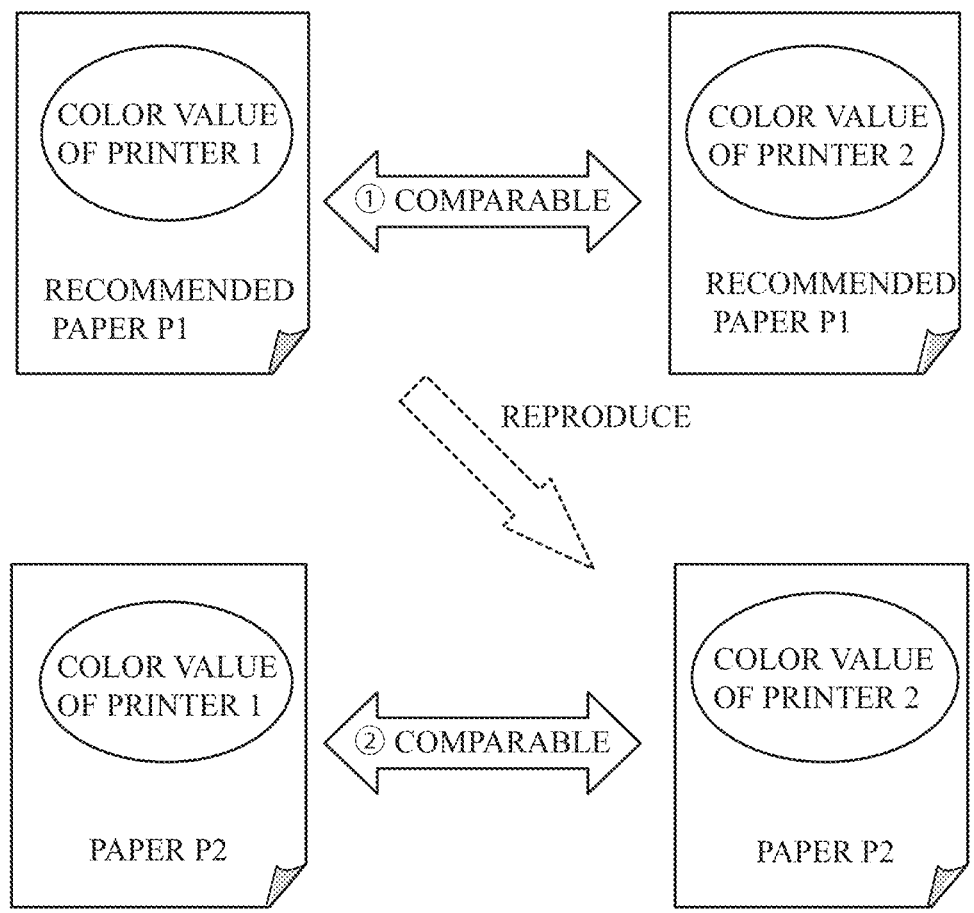
FIG. 12 shows a schematic diagram illustrating a method for reproducing a color value when paper is used that is different from recommended paper according to an embodiment of the present disclosure.

FIG. 10 shows a flowchart illustrating a generation procedure for reproduced data. First, the color value acquisition unit 101 acquires the color value for an arbitrary paper of the printer 2 (S401). Next, the information acquisition unit 106 for a reference color extracts the property of the reference color for the arbitrary paper (S402). Next, the search unit 107 searches within a specific storage area in the storage device 12 for a reference color for a relational expression (approximate data included) matching the property information of the reference color (S403). The color value prediction unit 108 calculates a predicted color value based on a regression process and the relational expression obtained as a search result, and the color value acquired in the S401 (S404). Subsequently, the reproduction unit 110 performs an arithmetic operation for a desired color value for the reproduction of the predicted color value (S405). In addition, the LUT application unit 111 applies a reproduced value to the LUT 12a (S406).

Next, a color adjustment program will be described. The color value acquisition function, the prediction relational expression generation function, the paper information registration function, the color value prediction function, the color reproduction function, and like of the computer (printer 1) in the embodiment are realized using the color adjustment program. The color adjustment program is provided using a computer-readable recording medium such as a ROM, a hard disk, a flexible disk, a memory card, or a magnet-optical disk. In addition, the color adjustment program is read into the computer (printer 1) from the above-mentioned recording medium, and subsequently an instruction is sent to each unit in the configuration of the computer (printer 1) to cause each unit in the configuration to execute the process.

Furthermore, when the color adjustment program is loaded into the CPU 11a, it may also be possible to download these programs from the other computers using a communication line into the RAM 11c included in the apparatus or an external storage device. This downloaded program is executed by the CPU 11a, and thus it may be possible to realize each function in the above-mentioned embodiment.

In this way, it may also be possible for the present disclosure to be implemented by a method or a program. In other words, it may also be possible to achieve an object of the present disclosure using an embodiment different from the color adjustment apparatus, and it may also be possible to achieve the same function effect.

While, as described above, the color adjustment apparatus, the color adjustment method, and the color adjustment program of the present disclosure have been described with illustrated embodiments, an embodiment of the present disclosure is not limited to the above-mentioned embodiments, and it should be understood that various modifications and implementations may occur. For example, while an example has been described where the above-mentioned color adjustment apparatus performs the double function of a printer, the color adjustment apparatus may also adopt an apparatus configuration exclusively including a color adjustment function. In addition, an embodiment of the present disclosure may be applied to not only paper but also another recording medium or a display medium, and an embodiment of the present disclosure may also be applied to an apparatus, a method, and a program that express color tones on such media.

The invention claimed is:

1. A color adjustment apparatus comprising:
a color value acquisition unit configured to acquire a color value for a specified paper of a desired image forming apparatus and a color value for one or more types of unspecified paper;
a relational expression generation unit configured to obtain, for each of one or more pieces of the unspecified paper, a relational expression associating the color value for the specified paper with the color value for the respective unspecified paper, wherein the relational expression generation unit is further configured to obtain a relational expression based on a predetermined regression learning process with respect to each of the one or more pieces of the unspecified paper, and wherein the predetermined regression learning process is based on the color value for the specified paper and the color value for the respective unspecified paper;
a paper information registration unit configured to obtain property information of a reference color for each of the one or more pieces of the unspecified paper and register an association between the relational expression and the property information of the reference color for each of the one or more pieces of the unspecified paper, wherein property information of a particular unspecified paper includes a spectral reflectivity corresponding to a predetermined wavelength of the particular unspecified paper;
a predicted color value calculation unit configured to calculate a predicted color value for the specified paper of another image forming apparatus based on the relational expression identified using property information of a reference color for arbitrary paper and a color value for the arbitrary paper of the other image forming apparatus; and
a reproduced color value setting unit configured to set the predicted color value as a color value to be reproduced by the desired image forming apparatus.

2. The color adjustment apparatus according to claim 1, wherein
the reproduced color value setting unit is further configured to set the predicted color value as a color value to be reproduced by the desired image forming apparatus by applying the predicted color value to a corresponding color value in a color conversion table based on the specified paper and preliminarily included in the desired image forming apparatus.

3. The color adjustment apparatus according to claim 1, wherein
the desired image forming apparatus comprises a printer.

4. The color adjustment apparatus according to claim 1, wherein
the color adjustment apparatus acquires the color values for the specified paper and the unspecified paper using a measuring instrument.

5. The color adjustment apparatus according to claim 4, wherein the measuring instrument comprises a scanner.

6. The method according to claim 1, wherein
calculating the predicted color value for the specified paper comprises:
obtaining (i) a plurality of spectral reflectivity values $t_{nm}$ corresponding to a respective plurality of wavelengths m and associated with the arbitrary paper n, (ii) a plurality of predetermined coefficients $b_m$ corresponding to the respective plurality of wavelengths m, (iii) a spectral reflectivity constant $t_{n0}$ associated with the arbitrary paper n, and (iv) an error term $\epsilon_n$ associated with the arbitrary paper n;
determining the predicted color value $a_n$ associated with the arbitrary paper n based on the following relational expression:

$$a_n = \sum_{m=380}^{730} t_{nm} * b_m + t_{n0} + \varepsilon_n$$

7. The method according to claim 6, further comprising:
performing the predetermined regression learning process on the relational expression using a Random Forest method for the plurality of wavelengths.

8. A color adjustment method comprising:
acquiring a color value for a specified paper of a desired image forming apparatus and a color value of one or more types of unspecified paper;

obtaining a relational expression associating, for each of one or more pieces of the unspecified paper, the color value for the specified paper with the color value for the unspecified paper;

obtaining a relational expression based on a predetermined regression learning process with respect to each of the one or more pieces of the unspecified paper, wherein the predetermined regression learning process is based on the color value for the specified paper and the color value for the respective unspecified paper;

obtaining property information of a reference color for each of the one or more pieces of the unspecified paper, wherein property information of a particular unspecified paper includes a spectral reflectivity corresponding to a predetermined wavelength of the particular unspecified paper;

registering an association between the relational expression and the property information of the reference color for each of the one or more pieces of the unspecified paper;

calculating a predicted color value for the specified paper of another image forming apparatus based on the relational expression identified using property information of a reference color for arbitrary paper and a color value for the arbitrary paper of the other image forming apparatus; and setting the predicted color value as a color value to be reproduced by the desired image forming apparatus.

9. The color adjustment method according to claim 8, wherein
setting the predicted color value comprises applying the predicted color value to a corresponding color value in a color conversion table based on the specified paper and preliminarily included in the desired image forming apparatus.

10. The color adjustment method according to claim 8, wherein
the desired image forming apparatus comprises a printer.

11. The color adjustment method according to claim 8, wherein
the color adjustment apparatus acquires the color values for the specified paper and the unspecified paper using a measuring instrument.

12. The color adjustment method according to claim 8, wherein
the measuring instrument comprises a scanner.

13. A non-transitory computer-readable recording medium storing therein a color adjustment program causing a color tone in another image forming apparatus to be reproducible in a desired image forming apparatus, the program causing a computer to function as follows:

a color value acquisition unit configured to acquire a color value for a specified paper of the desired image forming apparatus and a color value of one or more types of unspecified paper;

a relational expression generation unit configured to obtain, for each of one or more pieces of the unspecified paper, a relational expression associating the color value for the specified paper with the color value for the respective unspecified paper, wherein the relational expression generation unit is further configured to obtain a relational expression based on a predetermined regression learning process with respect to each of the one or more pieces of the unspecified paper, and wherein the predetermined regression learning process is based on the color value for the specified paper and the color value for the respective unspecified paper;

a paper information registration unit configured to obtain, for each of the pieces of the unspecified paper, property information of a reference color for the respective unspecified paper and register an association between the relational expression with the property information of the reference color for each of the one or more pieces of the unspecified paper, wherein property information of a particular unspecified paper includes a spectral reflectivity corresponding to a predetermined wavelength of the particular unspecified paper;

a predicted color value calculation unit configured to calculate a predicted color value for the specified paper of the other image forming apparatus based on the relational expression identified using property information of a reference color for arbitrary paper and a color value for the arbitrary paper of the other image forming apparatus; and a reproduced color value setting unit configured to set the predicted color value as a color value to be reproduced by the desired image forming apparatus.

14. The non-transitory computer-readable recording medium according to claim 13, wherein
the reproduced color value setting unit is further configured to set the predicted color value as a color value to be reproduced by the desired image forming apparatus by applying the predicted color value to a corresponding color value in a color conversion table based on the specified paper and preliminarily included in the desired image forming apparatus.

15. The non-transitory computer-readable recording medium according to claim 13, wherein
the desired image forming apparatus comprises a printer.

16. The non-transitory computer-readable recording medium according to claim 13, wherein
the color adjustment apparatus acquires the color values for the specified paper and the unspecified paper using a scanner.

* * * * *